(12) United States Patent
Miller (10) Patent No.: US 7,324,167 B2
(45) Date of Patent: Jan. 29, 2008

(54) HIGH-QUALITY TWISTED-PAIR TRANSMISSION LINE SYSTEM FOR HIGH-RESOLUTION VIDEO

(75) Inventor: Chris Miller, Kent, CT (US)

(73) Assignee: Magenta Research, Brookfield, CT (US)

( * ) Notice: Subject to any disclaimer, the term of this patent is extended or adjusted under 35 U.S.C. 154(b) by 736 days.

(21) Appl. No.: 10/791,636

(22) Filed: Mar. 2, 2004

(65) Prior Publication Data

US 2005/0198687 A1    Sep. 8, 2005

(51) Int. Cl.
| | |
|---|---|
| H04N 5/00 | (2006.01) |
| H04N 5/268 | (2006.01) |
| H04N 17/00 | (2006.01) |
| H04N 17/173 | (2006.01) |
| H04N 5/44 | (2006.01) |
| H04N 17/02 | (2006.01) |
| H01P 9/00 | (2006.01) |
| H04B 3/00 | (2006.01) |
| H04B 3/14 | (2006.01) |
| H04L 25/00 | (2006.01) |
| H04L 25/03 | (2006.01) |

(52) U.S. Cl. ............. 348/723; 348/192; 348/193; 348/607; 348/705; 348/725; 333/28 R; 725/107; 725/118; 725/127; 375/257; 375/296; 375/346

(58) Field of Classification Search .......... 348/723, 348/725, 192, 193, 607, 705, 706; 333/28 R; 725/107, 118, 127; 375/257, 296, 346
See application file for complete search history.

(56) References Cited

U.S. PATENT DOCUMENTS

| | | | | | |
|---|---|---|---|---|---|
| 3,736,369 | A  | * | 5/1973 | Vogelman et al. | 380/228 |
| 6,377,629 | B1 | * | 4/2002 | Stewart et al. | 375/257 |
| 6,377,709 | B1 | * | 4/2002 | Guillotel | 382/250 |
| 6,493,034 | B1 | * | 12/2002 | Elberbaum | 348/512 |
| 6,900,848 | B2 | * | 5/2005 | Sendelweck et al. | 348/607 |
| 7,047,556 | B2 | * | 5/2006 | Cole et al. | 725/149 |
| 2003/0169374 | A1 | * | 9/2003 | Cole et al. | 348/621 |
| 2006/0098725 | A1 | * | 5/2006 | Rhee et al. | 375/222 |
| 2007/0060059 | A1 | * | 3/2007 | Kim et al. | 455/63.1 |

* cited by examiner

*Primary Examiner*—Brian P. Yenke
(74) *Attorney, Agent, or Firm*—Hogan & Hartson LLP (57) ABSTRACT

A system comprising a first filter having an input and an output adapted to compensate for the characteristics of a first length of twisted-pair wire is disclosed. A first bypass path has an input and an output for bypassing the first filter. A second filter has an input and an output adapted to compensate for the characteristics of a first length of twisted-pair wire. A second bypass path has an input and an output for bypassing the first filter. A third filter has an input and an output adapted to compensate for the characteristics of a first length of twisted-pair wire. A third bypass path has an input and an output for bypassing the first filter. The three filters can be configured form a signal path or one or more filters removed from the signal path by switching in bypass paths.

9 Claims, 11 Drawing Sheets

HIGH-QUALITY TWISTED-PAIR TRANSMISSION LINE SYSTEM FOR HIGH-RESOLUTION VIDEO

BACKGROUND OF THE INVENTION

Almost as soon as the American painter, Samuel F. B. Morse, developed, with the invention of the telegraph, the first electrical communications system in 1832, contemporaries and those that followed in their footsteps were quick to see the potential of the new medium and began to dream and work toward the implementation of video transmission over an electrical channel.

Perhaps one of the first practical implementations of picture transmission is reflected by "facsimile" systems patented in the 1860s. In these systems, a candle, illuminating an image which was to be transmitted, provides an image which was focused onto rotating disk with strategically placed holes, similar to that which would later be used by Nipkow. The optical output of the disk was passed to a photoelectrical device which sent an electrical signal over a transmission line to a receiver. The receiver comprised a rotating metal drum with a sheet of paper wrapped around it. The paper was impregnated with gunpowder and as the drum rotated, the end of a fine metal wire scanned across the length of the drum, defining a helix along the surface of the drum. The signal from the transmission line drove an electrical spark between the end of the wire and the drum when certain video levels were reached, resulting in the selective ignition of the gunpowder and associated localized burning of the image into the paper. Such gunpowder-based receivers continued to be used in commercial applications into the 1950's for the purpose of transmitting so-called "wirephotos" in the newspaper business. Indeed, the phrase "burning a copy" is still used today when referring to the recording of information in any medium.

By 1884, Paul Nipkow proposed the transmission of a live moving picture by dividing a visual scene into a plurality of frames. The frames were, in turn, divided into a matrix of raster lines implemented by scanning an image with a disk including a plurality of strategically placed holes. The holes were positioned to define the raster lines at the position of the image when the disk was rotated. The light passed by the disk thus formed a first video signal comprising a series of light intensity reading corresponding to a sequence of points in a well-defined order that could be reassembled at the other end of a transmission channel.

While binary transmissions, such as those used by Morse, impose minimal requirements on the transmission line, increasing bandwidth in the frequency domain will increase the criticality of the transmission line characteristic. Nevertheless, digital transmission is substantially immune to noise and transmission line characteristics as long as noise and distortion remain below certain threshold limits, after which errors avalanche substantially destroying communication. An example of this is found in wireless telephone communication, where quality tends to remain at a very acceptable level until the threshold of the system is exceeded and the signal simply disappears.

Conversely, analog transmission introduces proportional sensitivity to transmission line noise and characteristics from the lowest levels of noise and distortion, but without the cataclysmic breakdown of the medium at higher levels of noise. Compare the above example of a connection in a cellular telephone system to the "snowy" picture received from a distant television station, which, despite its inclusion of numerous elements of noise, continues to provide a reasonable facsimile of the transmitted image.

High-density video information remains the most information dense analog signal in common use. The most demanding video applications involve high-resolution computer video. Not surprisingly, these high-resolution computer video signals, unlike audio signals and far more critically than conventional NTSC television signals, do not travel well over common transmission lines, such as unshielded twisted-pair lines. Complications include attenuation of the signal along the length of the line and, due to the interaction of irregular capacitance and inductive components distributed along the length of the line, a frequency domain characteristic which can cause severe degradation in two aspects of the video signal.

The first aspect of the problem is the distortion of the synchronization pulses which insure alignment of the raster lines with respect to each other and registration of successive fields and frames in the video signal. This problem can become particularly severe in the case of relatively long transmission lines.

The second aspect of the problem is the distortion or degradation of the video signal itself. Such signals generally comprise both multiple color channels. The speed with which video information varies, combined with phase and amplitude varying effects of distributed conductive, capacitance and resistive components of the transmission line, can cause substantial degradation of a video signal. This degradation is frequency and distance dependent. More particularly, the losses increase geometrically with frequency and distance. Rise time and time domain performance are progressively impacted as the transmission line length increases. As the rise times begin to exceed some small multiple of single pixel duration time, the image begins to suffer from aperture distortion with a horizontally smeared appearance. Image detail becomes reduced and quickly degrades to the point where small text becomes illegible. Areas of the image where there are transitions from dark to light and light to dark, become ill-defined and can quickly cause viewer fatigue.

Quantitatively, losses over unshielded twisted pair are approximated by the expression:

$$L=0.988(1.967vf)+0.023f+(0.05/vf),$$

where L represents losses in dB per 100 meters, f is frequency and v is a constant.

Traditionally, transmission lines for carrying video almost always took the form of coaxial cable. Coaxial cable, invented in 1929 by Lloyd Espenschied and Herman Affel of Bell Labs, generally comprise a twisted or solid copper wire axial conductor surrounded by a flexible plastic dielectric insulator having a generally circular cross-section. The insulator is, in turn, surrounded by a tubular woven copper wire mesh, which forms a cylindrical shield around the axial copper member. The structure of the cable is completed by an outer flexible insulator skin comprising a layer of rubber or similar synthetic material. Such a coaxial transmission line provides a balanced transmission channel having low losses, minimal distortion, and a well-defined characteristic substantially limited to signal attenuation, provided that either the output impedance of the driving source is matched to the impedance of the coaxial cable or the length of the cable is calculated to compensate for any mismatch.

Commercially available coaxial cables do an excellent job of transmitting high-resolution computer video signals over moderate distances. However, as with any other metallic transmission line, provision of accurate signal transmission over more than a few hundred feet, requires active equalization to compensate for the erosion of bandwidth. Coaxial cables also suffer from a number of specific drawbacks. First of all, coaxial cable is physically stiff, heavy and hard to handle. Termination of the coaxial cable with an appropriate connector is also a relatively, complicated and time-consuming task which is not well-suited to mechanization, involving selective removal of different lengths of axial central conductor, dielectric insulator, woven shield and outer insulative skin. Termination of coaxial cable in the field is prohibitively expensive, and the quality of the terminal installation is difficult to control. For computer type video, which requires a total of five signals, five individual cables must be used to carry the information. If five such cables are to be used, the length of each one must be tightly controlled to reduce the effects of varying signal propagation times. Not doing so will cause a deterioration of color convergence of the displayed image. Since coaxial cable is very expensive compared to other cable products, it becomes quite unattractive as a universal baseband video transportation and distribution solution.

The information age has fostered the pursuit of bandwidth and granular connectivity. With an eye toward cost, it was nearly inevitable that the communications industry would distill the requirement down to a simple, structured approach for the physical interconnect layer. Hence the development and adoption of structured cabling or unshielded twisted pair ("UTP").

Accordingly, strong prejudices in the computer industry in favor of twisted-pair and other inexpensive and easy to handle and terminate transmission lines have resulted in the supplantation of coaxial cable by twisted-pair.

In relatively short lengths, for example one to fifteen meters twisted pair performance in transmitting video signals ranges from excellent to fair, respectively. Longer length traditionally require the use of coaxial cable if high quality signal transmission characteristics are desired.

Some attempts have been made to address the more serious aspects of long length twisted pair transmission lines. More particularly, it has been recognized that synchronization errors are equally as serious as distortions in image detail resolution.

More particularly, degradation tends to exhibit itself as a loss of resolution and can be tolerated when the loss of details of the picture are not so critically evaluated by the eye and, sometimes, or not critical to a general understanding of the transmitted image. For example, degraded pictures of people in motion, while they may not have a high-quality appearance, will not be disturbing to the viewer. On the other hand, the degraded image of small font type, or, for example, hair of a model on whom a hair treatment product is being demonstrated, may make comprehension of the content of a video transmission difficult or impossible.

On the other hand, distortions in synchronization signals result in loss of registration between frames and/or loss of alignment between lines in a rasterized image. Worse still, with today's digital display technology, a momentary loss of sync information causes the complete loss of an image for many seconds while the equipment falls into "mute condition" and struggles to re-map the incoming signal. This sort of loss in signal quality results in a highly visible and disturbing degradation in displayed image quality. Such poor performance is not tolerated by the eye and is absolutely unacceptable by any commercial standards.

In an effort to address the more serious problems involved in accurately sending synchronization information over an unshielded twisted-pair cable and also to find a practical way to accommodate the transport of five signals on four pairs of wire, various approaches have been proposed. One of the most common techniques is to transport the baseband signals over two discrete "phantom circuits." John Joseph Carty, a Bell engineer, invented the concept of phantom or side circuits in 1886. By driving the center tap of balanced loading coils in each of the two circuits, the technique enable the carriage of three separate telephone signals over two circuits. This was an excellent solution for voice signals and can even work fairly well for video sync signals over UTP cable for short distances.

For video sync transmission, the technique suffers from poor noise immunity and relies upon an uncontrolled impedance mode of the cable, namely the impendence between alternate pairs. To gain reasonable noise immunity, the threshold levels must be fairly high in amplitude and as such, cause the transition points to become sensitive to cable length. This is due to the relationship between the cable high frequency attenuation and length. The longer the cable, the slower the rise time and the later the sync pulse transition occurs. Therefore, as the cable length increases, the sync transition is delayed, and the presented image shifts very noticeably to the right side of the viewing area. Another technique relies on encoding the two sync signals, combining them and then transporting them together on the fourth pair. This technique provides good noise immunity but, unless a separate equalizer is used to overcome the losses encountered in the cable, similar time displacement errors occur as with the phantom circuit technique. Also, with this technique, the difference in propagation time between the "fourth pair' and the other pairs exacerbates the time displacement issue. Lastly, using one entire pair to transport sync signals yields poor economy since the pair cannot easily be used for any other more valuable purpose.

Clearly, a more desirable approach is to transport the sync signals along with the video signals where the transit time through the cable for the sync and video signals is identical. This approach also allows for an economically appealing architecture, where the sync signals are processed by the same cable loss equalizer as the video. Doing so restores the rise time of the sync pulse, thus eliminating the time displacement concern.

A significant challenge in making this approach successful is to remove the sync signals from the video prior to their interface with the display. Failure to do so will result in unpredictable image presentation quality. Part of the inventive solution is to sum the sync signals along with the video signal for transportation through the cable and then remove said sync signal with a high performance clamping circuit prior to outputting it to the display before transmission through the cable with relatively high magnitude synchronization signals.

While such high magnitude synchronization signals/unshielded twisted-pair systems provide a good alternative, in many applications, to coaxial transmission lines, the degraded nature of the images makes them undesirable for many applications.

SUMMARY OF THE INVENTION

In accordance with the present invention, image resolution and synchronization are maintained over relatively long unshielded twisted-pair transmission lines, while simultaneously, the video image detail and signal quality is preserved. The same is achieved through the use of a multi-pole filter adapted to particular line lengths and a high-speed synchronization signal processor. In accordance with the preferred embodiment, the filter is composed of a number of sections adapted to compensate a set of distortions associated with a fixed transmission line length, and associated selected filter characteristics. Optionally, one of the filters may be made variable to accommodate relatively small variations in transmission line lengths, thus providing a compensation characteristic for transmission lines of any length.

In accordance with one preferred embodiment of the invention, a plurality of filter sections are provided. These filter sections are scaled to maximize the range of lengths which may be accommodated by the filter along a discrete or continuous range of lengths.

In accordance with the invention, a simple, practical, high performance and cost effective and repeatable approach is provided for compensating for broadband signal losses in electrical signal transmission lines. The inventive system provides compensation for a range of cable lengths varying from very short to very long. The option is provided for granular adjustability through the use of a plurality of fixed filter sections. Optionally, an adjustable filter may be added to the system to provide continuous length adjustability.

More particularly, the inventive system provides a switchable cascade of fixed filters and, optionally, one variable filter. Application of the system is advantageous for transporting high-resolution video over long distances using unshielded twisted-pair or shielded twisted-pair cable. The inventive system is also susceptible of application to the transport of high-speed digital data over unshielded twisted-pair, shielded twisted-pair and other copper-based signal transmission lines such as telephone lines or coaxial cable.

In accordance with a preferred embodiment of the invention, a first filter has an input and an output adapted to compensate for the characteristics of a first length of twisted-pair wire. A first bypass path has an input and an output for bypassing the first filter. A second filter has an input and an output adapted to compensate for the characteristics of the first length of twisted-pair wire. A second bypass path has an input and an output for bypassing the first filter. A third filter has an input and an output adapted to compensate for the characteristics of the first length of twisted-pair wire. A third bypass path has an input and an output for bypassing the first filter.

In accordance with a preferred embodiment, the first, second and third filters are multi-pole devices with the poles being defined by a plurality of resistor capacitor networks.

A coupling device couples an input high resolution video signal. A first input switch connects the coupling device to the input of the first filter or the first bypass path. A first output switch couples the output of the first filter, when the first input switch is connecting the coupling device to the input of the first filter, or couples the first bypass path when the first input switch is connecting the coupling device to the first bypass path. A second input switch connects the first output switch to the input of the second filter or the second bypass path. A second output switch couples the output of the second filter, when the second input switch is connecting the first output switch to the input of the second filter, or couples the second bypass path when the second input switch is connecting the first output switch to the second bypass path. A third input switch connects the second output switch to the input of the third filter or the third bypass path. A third output switch couples the output of the third filter, when the third input switch is connecting the second output switch to the input of the third filter, or couples the third bypass path when the third input switch is connecting the second output switch to the third bypass path. An output coupling line is coupled to receive the output from the third output switch.

Alternatively, the second and third lengths are equal to each other, the first length is twice as long as the second length.

A clamping system couples the third output switch to the output coupling line. The clamping system comprises a high-speed operational amplifier first clamp coupled to the output of the third output switch. The output of the operational amplifier first clamp is coupled to one end of a forward-biased semiconductor junction. The other end of the semiconductor junction is coupled to a second semiconductor clamp. The second semiconductor clamp has a second junction and exhibits capacitance across the second junction. A third semiconductor clamp receives the output of the second semiconductor clamp. The third semiconductor clamp is biased to cause a geometric increase in current flow through the third semiconductor clamp to regulate an undershoot condition at the output of the second semiconductor clamp.

BRIEF DESCRIPTION OF THE DRAWINGS

The operation of the invention will become apparent from the following description taken in conjunction with the drawings, in which.

DETAILED DESCRIPTION OF THE PREFERRED EMBODIMENT

Figure 1:
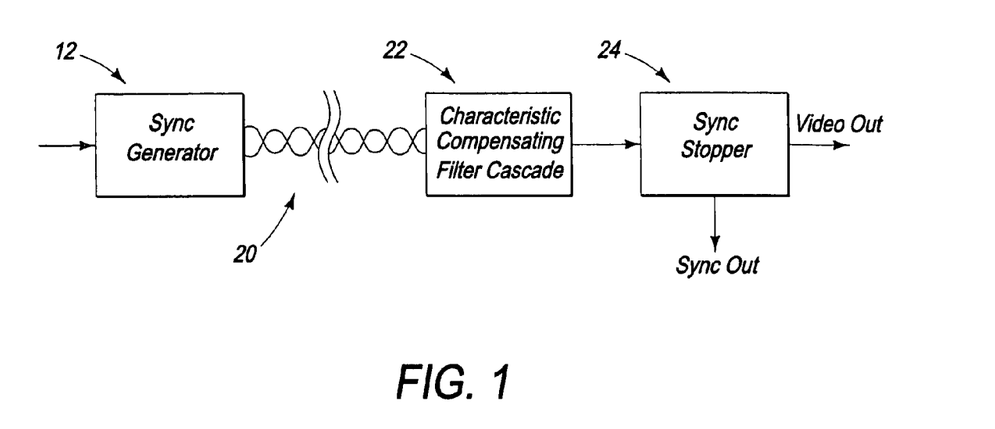
FIG. 1 Is a block diagram illustrating the system of the present Invention.
Figure 2:
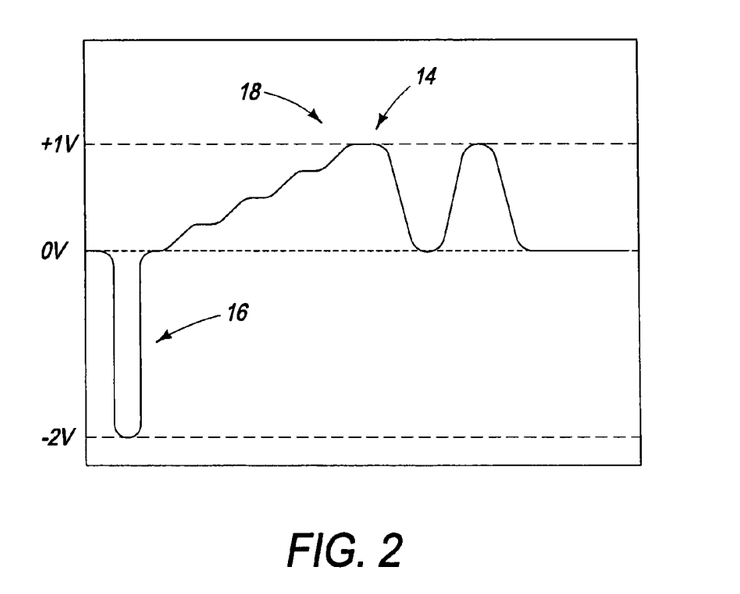
FIG. 2 illustrates a video signal useful in conjunction with the filter compensation network of the present invention.

Referring to FIG. 1, a long-distance signal transmission constructed in accordance with the present invention is illustrated. Component color signal transmitting subsystem 10 comprises a synchronization generator circuit 12 which, in accordance with the invention, receives one color component of a conventional high-resolution computer video signal and produces a modified video signal 14, as illustrated in FIG. 2. It will be understood that a complete system comprises three such subsystems 10, one dedicated to the red signal, one dedicated to the green signal and the third dedicated to the blue signal.

Modified video signal 14, in accordance with the invention, is provided with a large negative going synchronization pulse 16 having a peak amplitude of −2 volts. Signal 14 also includes an analog video portion 18 varying between zero volts, which corresponds to black, and one volt which corresponds to white. It is noted that the use of a large negative going pulse is not necessary in accordance with the system of the present invention which will provide advantageous characteristics utilizing only the filter cascade network described below.

The video output 14 of synchronization generator 12 is provided to unshielded twisted pair transmission line 20, which, in accordance with the invention may be relatively long, for example in the range of 500 to 1500 feet, or much longer. As discussed above, while the relatively large magnitude of synchronization pulse 16 provides noise immunity with respect to synchronization, substantial degradation in picture quality occurs along the length of unshielded twisted-pair transmission line 20. In accordance with the invention, the distorting characteristic of transmission line 20 is balanced by a complementary compensating characteristic provided by a filter cascade network 22. Network 22 receives the degraded output of unshielded twisted-pair transmission line 20 and outputs a relatively undistorted signal to synchronization stripper circuit 24 which outputs a signal corresponding to analog video portion 18 on video signal 14 which was input into the transmission line.

While the synchronization stripper circuit 24 has been shown as receiving the output of filter cascade network 22, the synchronization pulse may removed prior to synchronization stripper circuit 24.

Figure 3:
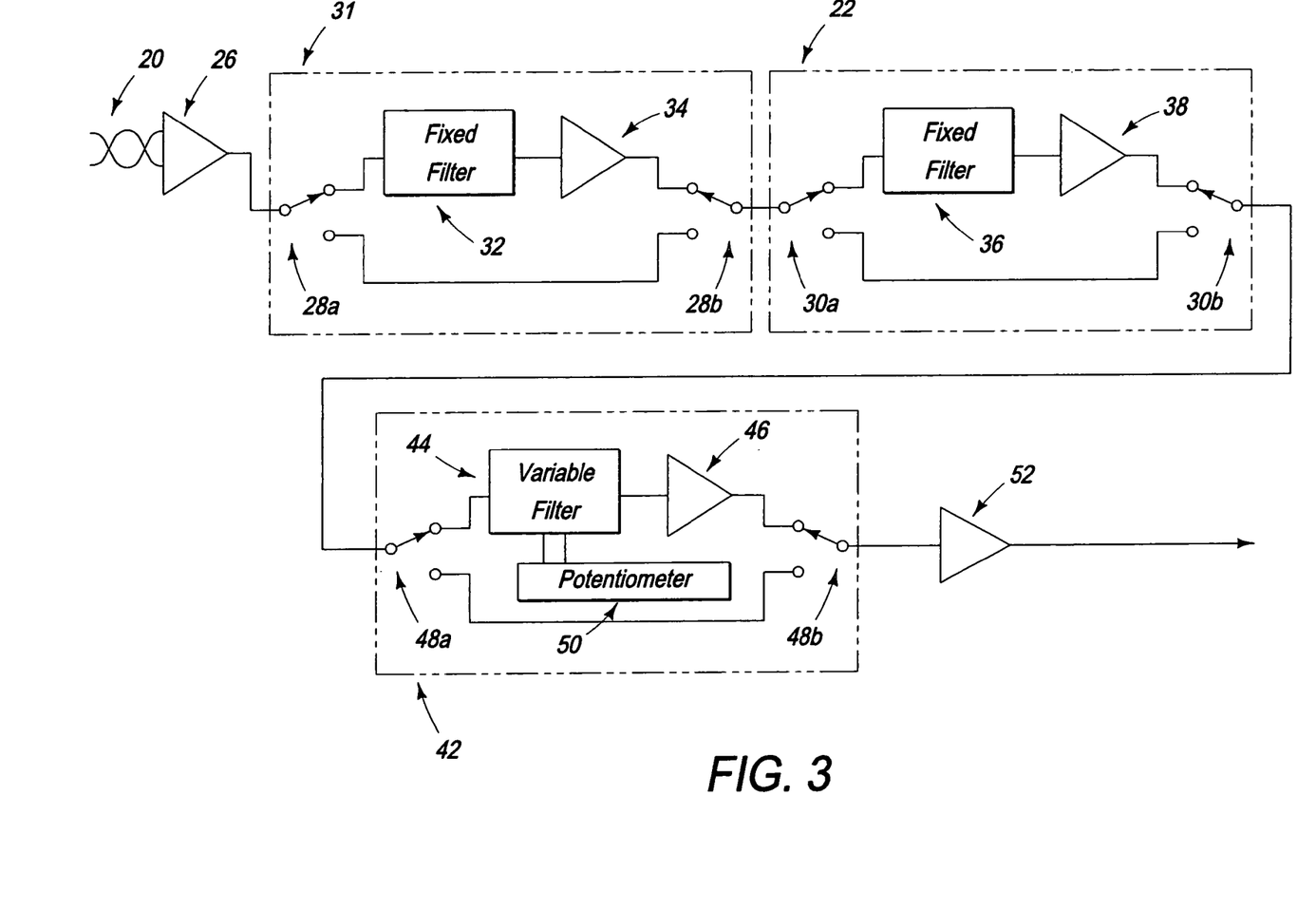
FIG. 3 is the details illustrating the filter design of the inventive system as illustrated in FIG. 1.

The operation of filter cascade network 22 may be understood with reference to FIG. 3. An electrical signal input into network 22 is first amplified by an input amplifier 26 whose output is coupled to a two gang single pole double throw selector switch 28, comprising a first single pole double throw section 28a and a second single pole double throw section 28b. Switch 28 may be a simple mechanical switch or an electronic equivalent. Switch 28 may take the position illustrated in FIG. 3, where a filter stage 31 comprising a fixed filter 32 and an amplifier of 34 are connected to receive the output of amplifier 26. Alternatively, switch 28 may be put, in response to user selection, in the position illustrated in FIG. 4, where the output of amplifier 26 bypasses filter stage 31.

The output of amplifier 34 is coupled by switch section 28b to single pole double throw switch section 30a, whose operation is, in response to a user selection, coupled to single pole double throw switch section 30b, or to the input on fixed filter 36, which together with amplifier 38 forms a second filter stage 40. Switch 30, which may be identical to switch 28, may also be of electronic or mechanical construction.

A third filter stage 42 similar to filter stages 32 and 40 is provided in accordance with the present invention. However, filter stage 42 includes a variable filter 44 whose output is coupled to an amplifier 46. Here again, a double pole, double throw selector switch 48 comprising a first section 48a and a second section 48b. Variable filter 44 may be adjusted by a potentiometer 50. Finally, filter cascade network 22 is completed by an output buffer amplifier 52.

Figure 4:
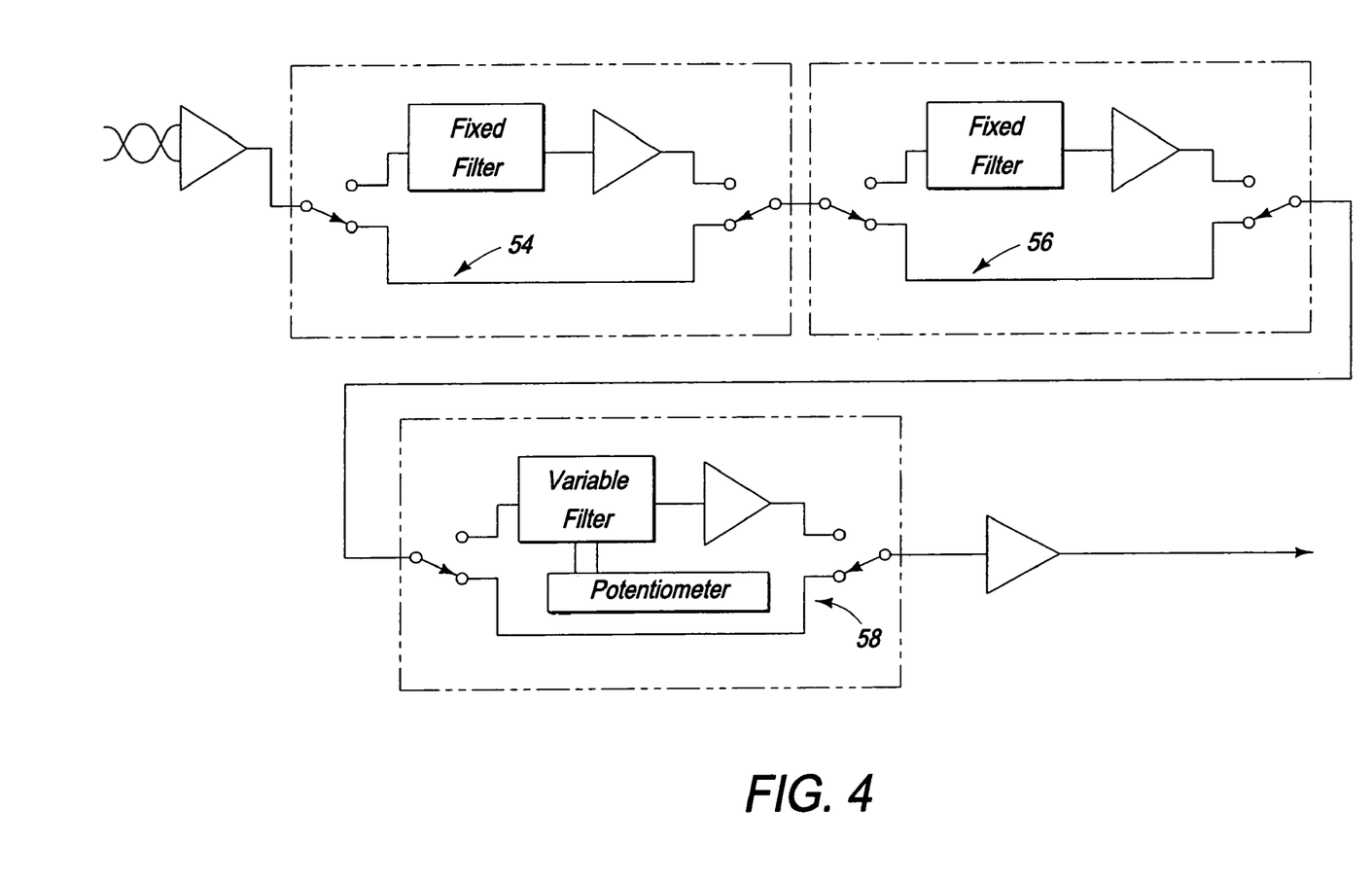
FIGS. 4-5 illustrate alternative configurations for the inventive filter network illustrated in FIG. 3.

In accordance with the present invention, the invention system may be configured to compensate a range of transmission line lengths varying, for example, between zero and 500 feet. If this is the case, the system is configured as illustrated in FIG. 4. In this configuration, signals transmitted over twisted-pair 20 are carried through amplifier 26 by switches 28 and 30 through bypass paths 54 and 56. Adjustment of transmission line loss compensation is made by adjustment of potentiometer 50. Such adjustment may be done by a visual inspection of the displayed video signal. Variable filter 44 is configured to compensate for various transmission line lengths ranging from zero to 500 feet.

Figure 5:
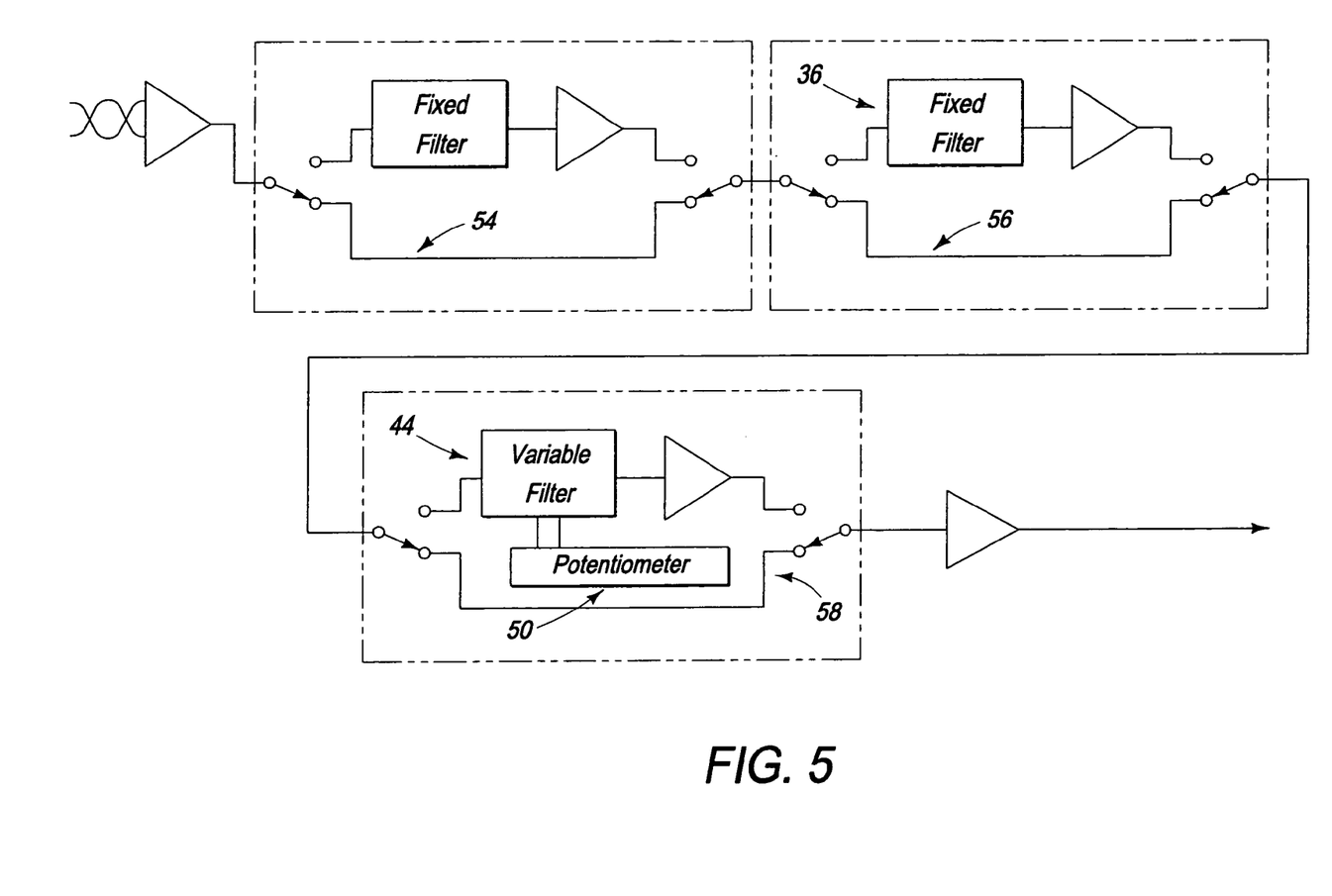

In accordance with the present invention, the invention system may further be configured to compensate a range of transmission line lengths varying, for example, between 500 and 1000 feet. If this is the case, the system is configured as illustrated in FIG. 5. In this configuration, signals transmitted over twisted-pair 20 are carried through amplifier 26 by switch 28 through bypass path 54, but not through bypass paths 56 and 58, thus causing them to pass through filters 36 and 44. Adjustment of transmission line loss compensation, dependent upon transmission line length between 500 and 1000 feet is made by adjustment of potentiometer 50. Such adjustment may be done by a visual inspection of the displayed video signal. Fixed filter 36 is configured to compensate for the additional 500 feet and for the distortions caused by filter 44.

In this respect it is noted that filter 44, while it does provide some improvements, is not perfect. Those distortions which it does introduce are complicated by the additional distortions of the additional length of transmission line. Accordingly, filter 36 is optimized using a trial and error process, varying component values for the resistors and capacitors which form the multi-pole filter 36 until acceptable performance is achieved.

In accordance with the present invention, the inventive system may yet further be configured to compensate a range of transmission line lengths varying, for example, between 1000 and 1500 feet. If this is the case, the system is configured as illustrated in FIG. 3. In this configuration, signals transmitted over twisted-pair 20 are carried through amplifier 26 by switch 28 through filters 32, 36 and 44. Adjustment of transmission line loss compensation, dependent upon transmission line length between 1000 and 1500 ft. is likewise made by adjustment of potentiometer 50. Such adjustment may be done by a visual inspection of the displayed video signal. Fixed filter 32 is configured to compensate for the distortions of filters 36 and 44 as well as the additional 500 feet.

In accordance with the preferred embodiment, it is also possible to remove filter section 42 from the system through the use of bypass path 58, if one wishes to use a coaxial drive, very short transmission line, or to respond to or make an empirical determination that removal of the filter from the signal path improves performance.

Figure 6:
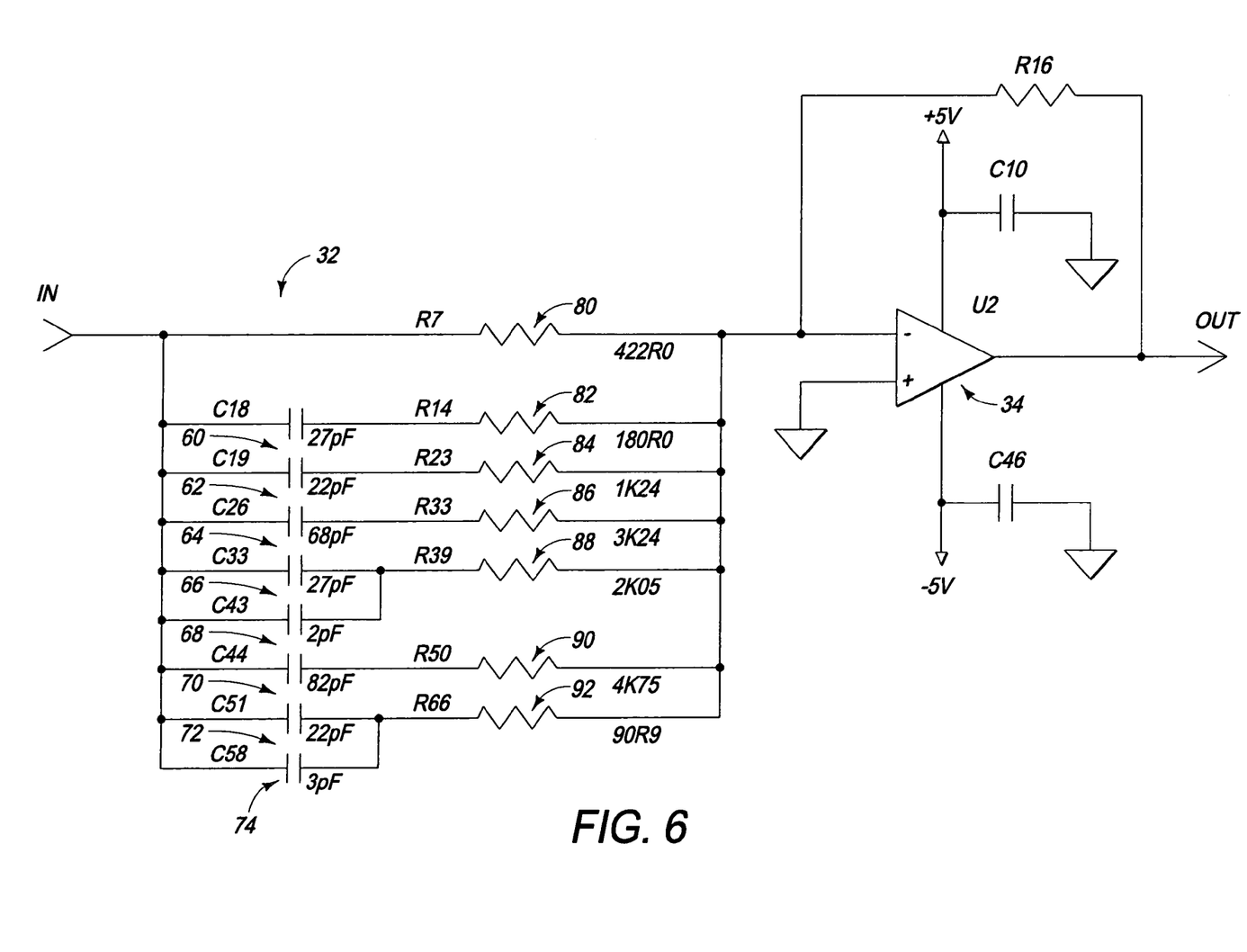
FIGS. 6-8 illustrate details how they filter is illustrated in the block diagram of FIG. 3.

The construction of filter 32 may be understood with reference to FIG. 6. More particularly, the poles of the filter are provided by a plurality of high pass filters formed by resistors 60-76 coupled to capacitors 80-96, respectively. The resistors and capacitors have the component values noted in the figure.

Figure 7:
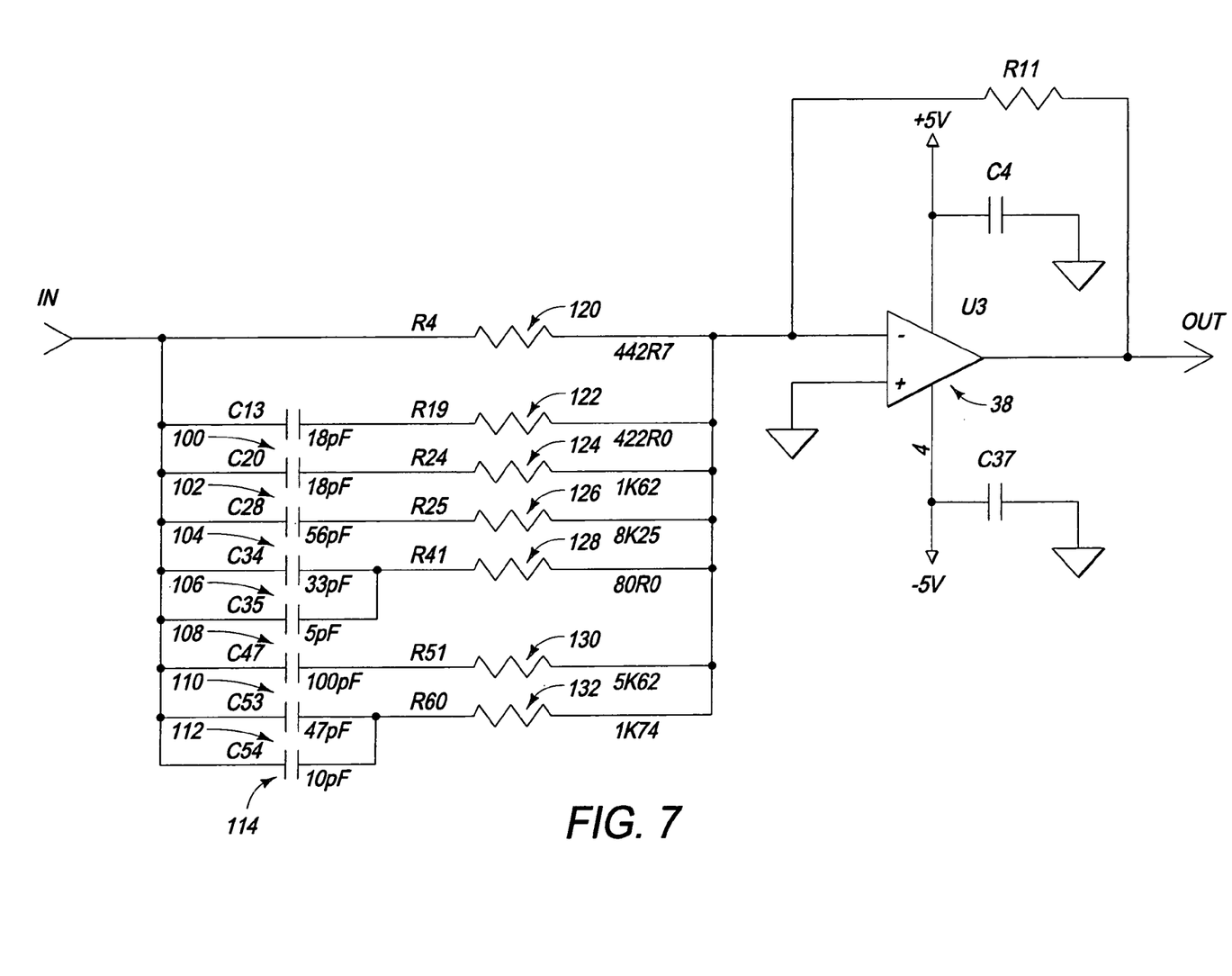

The construction of filter 36 may be understood with reference to FIG. 7. More particularly, the polls of the filter are provided by a plurality of shelved high pass filters formed by resistors 100-116 coupled to capacitors 120-136, respectively.

Figure 8:
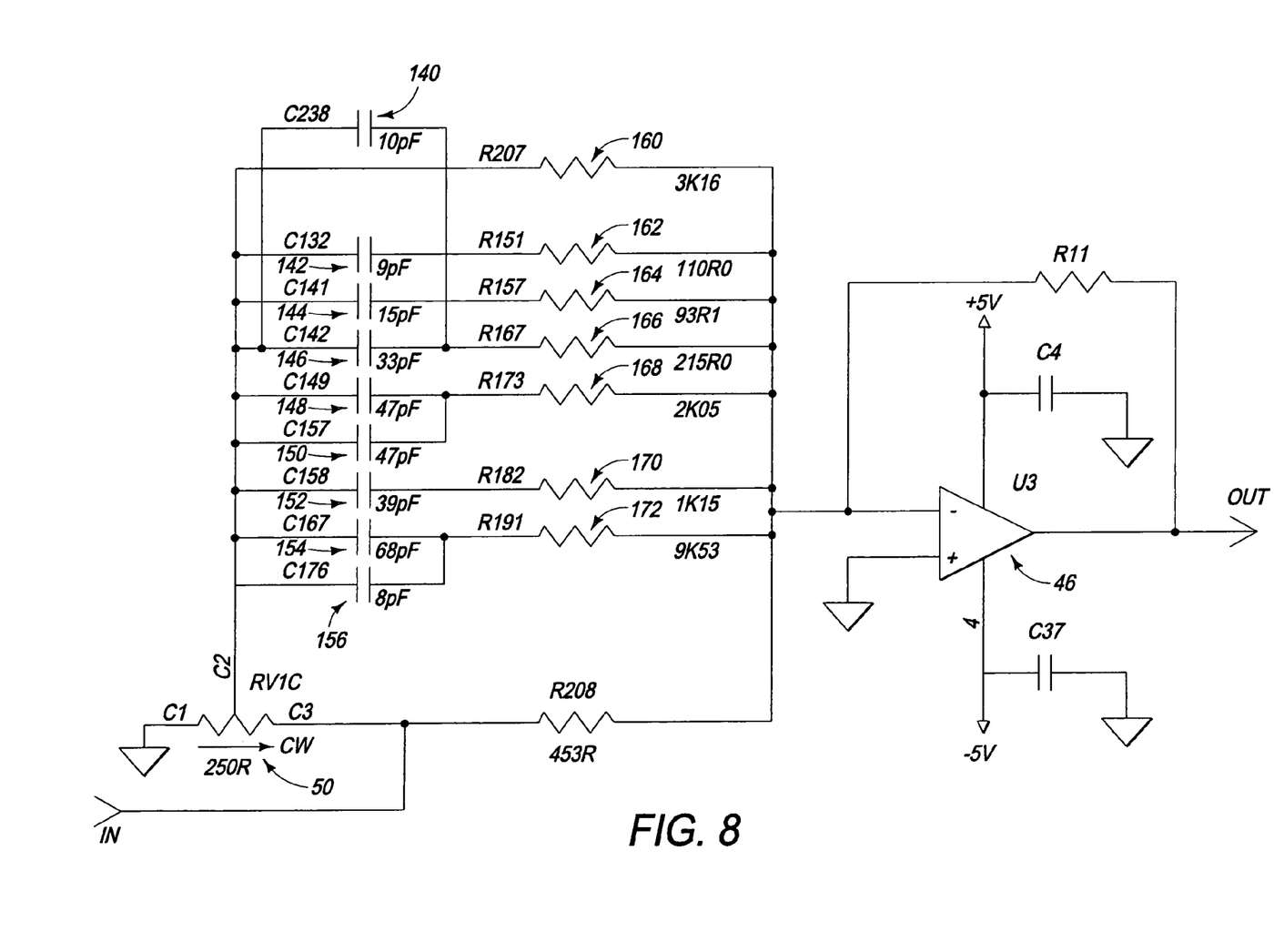

The construction of filter 44 may be understood with reference to FIG. 8. More particularly, the poles of the filter are provided by a plurality of high pass filters formed by resistors 140-156 coupled to capacitors 160-176, respectively.

Figure 9:
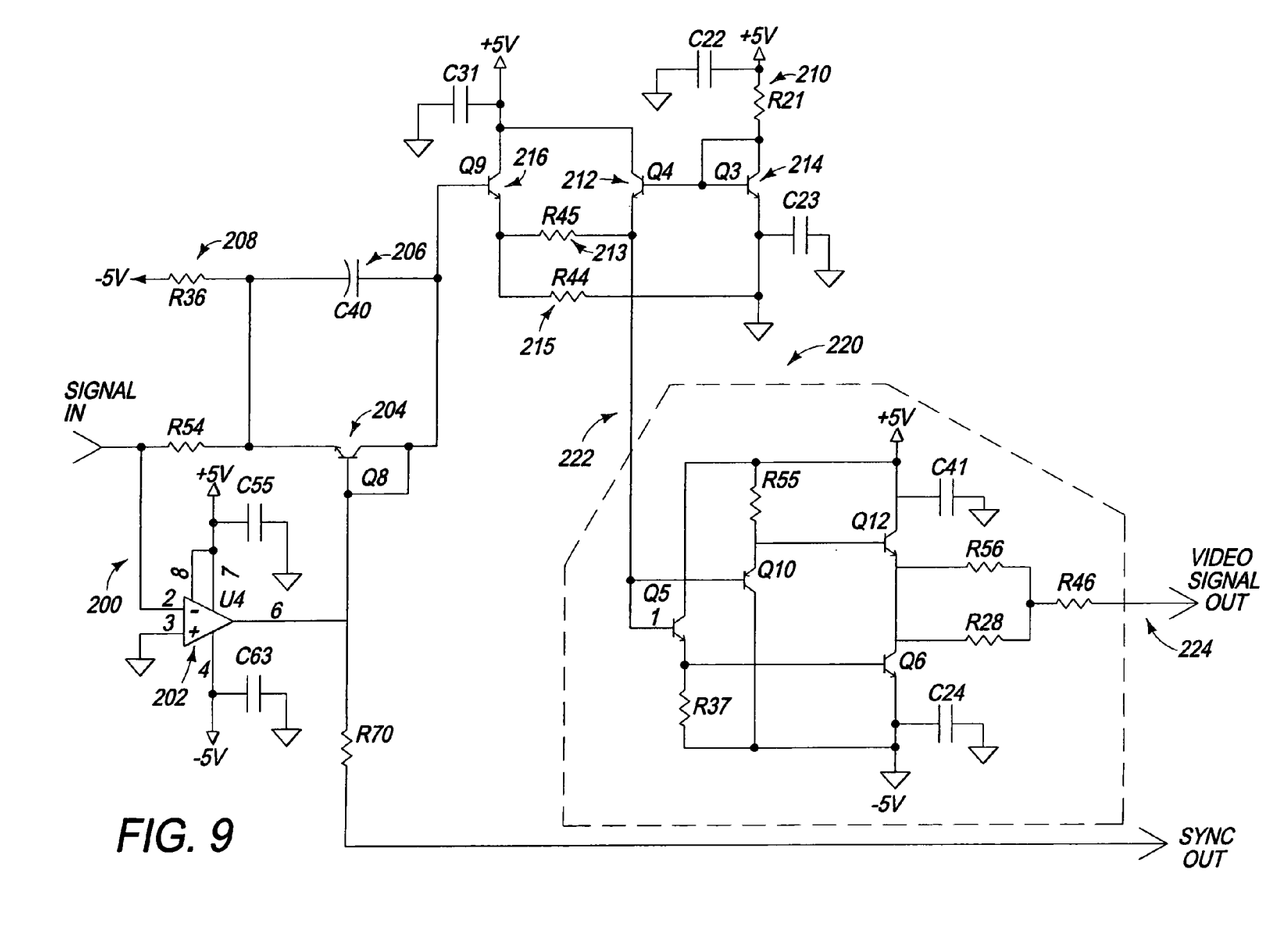
FIG. 9 illustrates an optional synchronization stripping circuit useful in the system of the present invention.
Figure 10:
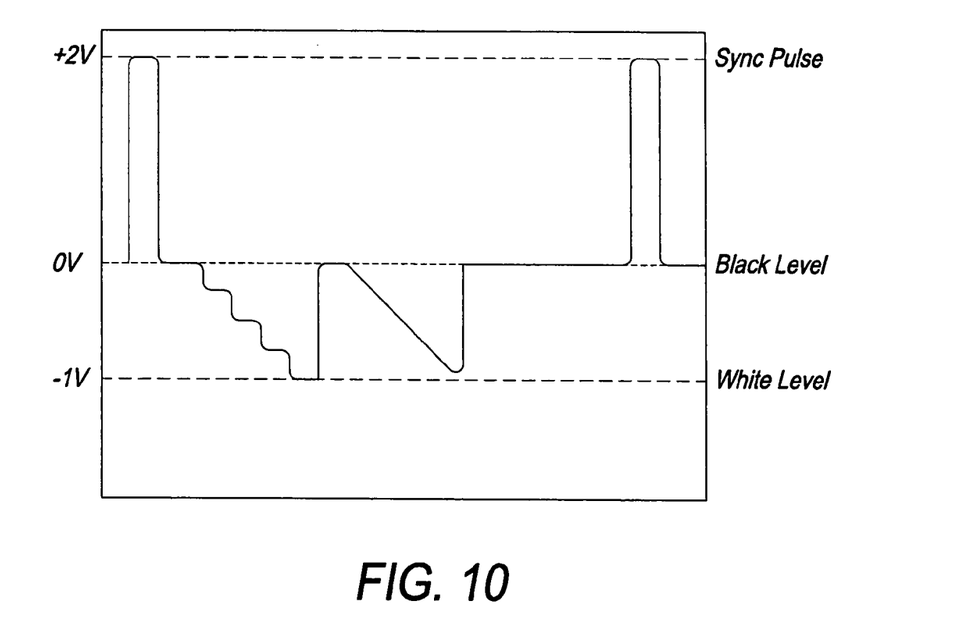
FIGS. 10-14 illustrate successive waveforms in the processing of each single color video signal during the synchronization stripping process.

The operation of the inventive synchronization stripper may be understood with reference to FIG. 9, which illustrates a circuit embodying the invention. Generally, and input signal is coupled to the negative input 200 of an operational amplifier 202. Operational amplifier 202 is a high-speed device which clamps and buffers the output video signal. Transistor 204 is connected to function as a diode resulting in low gain and a positive voltage offset proportional to that of the negative synchronization pulse. Effective forward biasing of transistor 204 is provided by capacitor 206 during negative signal swings.

The objective is a high-performance technique for removing negative going synchronization pulses from high-resolution computer video signals filtered by the preceding stages. As alluded to above, the inventive system uses large magnitude synchronization pulses for noise immunity and improved signal-geometry tolerance.

While, in principle, synchronization removal should remove all traces of the original pulse, it is sufficient if synchronization artifacts which remain after removal of the pulse have a value of 50 millivolts or less. In practice, complete removal of synchronization artifacts is, from a practical standpoint, difficult and expensive. However, if attenuation of the pulse is not at an acceptable level, for example, if the pulse artifacts are on the order of hundreds of millivolts, undershoot may cause display equipment to falsely store the value of the bottom of the pulse as the black level, causing color shifting and other problems.

In the inventive approach, the use of a high-speed operational amplifier and a series of four transistors provides very abrupt clamping with extremely low undershoot. High-speed operational amplifier 202 buffers the incoming signal and along with transistor 204 imparts a positive offset value, equal to the voltage drop across forward-biased junction (about 0.7 volts). Transistor 204 is forward biased by a resistor 208 to roughly match the current flowing through resistor 210, transistor 212 and transistor 214.

The offset video output of operational amplifier 202 is coupled to the base of transistor 216, which is in a ground-referenced emitter-follower configuration. Transistor 216 provides clamping of the signal at just above the cutoff voltage of the transistor. However, base to emitter capacitance contributes to a slight undershoot condition at the output of the emitter of transistor 216. An additional clamp, comprising transistors 214 and 212, and resistor 210 reduces the effects of capacitance coupling. Resistor 210 and transistor 212 provide a quiescent bias voltage for transistor 214. As the signal applied to the emitter of transistor 214 goes negative with respect to zero, the bias of transistor 214 causes a geometric increase in current flow through transistor 214 which functions to further clamp the signal. The output of transistor 212 is provided to a buffer amplifier 220 over line 222. The output of buffer amplifier 220 is provided over line 224.

More particularly, the operation of the inventive synchronization stripper or pulse remover may be understood with reference to FIGS. 9-14, which illustrates an exemplary circuit embodying the invention. Generally, a composite video input signal (FIG. 10) containing both visual and sync information is coupled via a gain setting resistor to the inverting input or summing node 200 of an operational amplifier 202. Operational amplifier 202 is a high-speed device, which together with an optional cable loss compensation filter network (FIGS. 6-8, whose output is coupled to node 200), provides either "flat" or "frequency selective" gain and buffers the output video signal prior to further processing.

Figure 11:
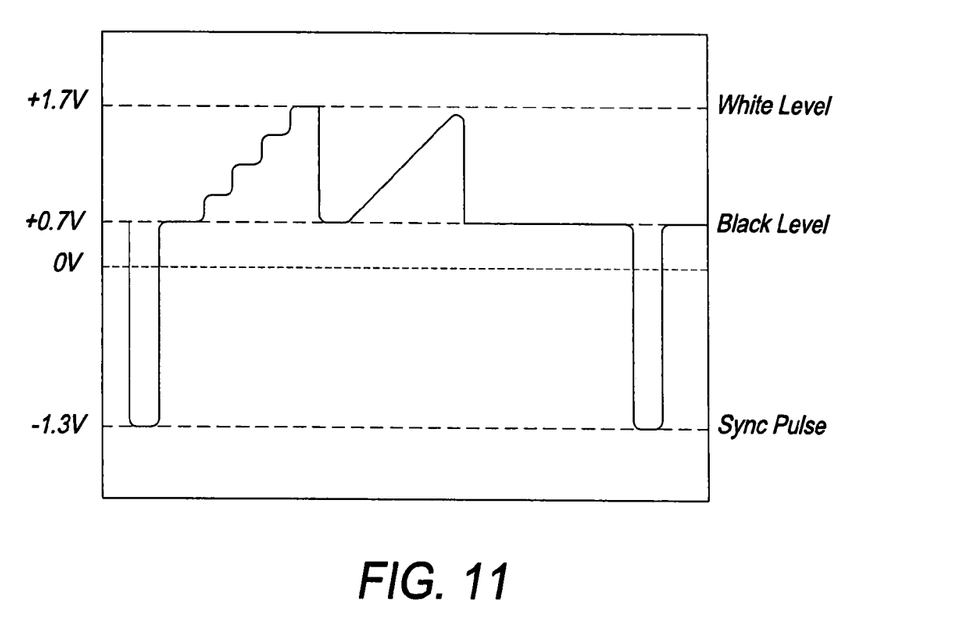
Figure 12:
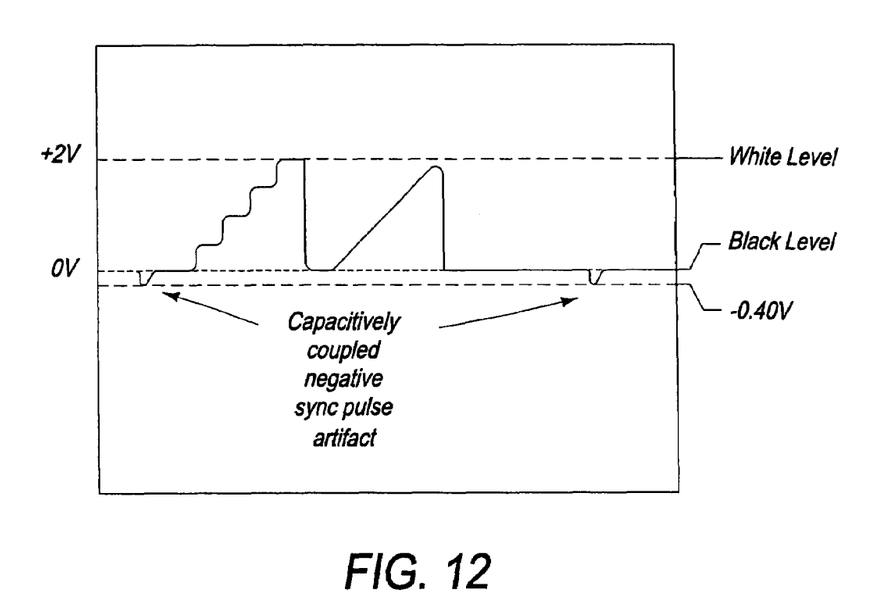
Figure 13:
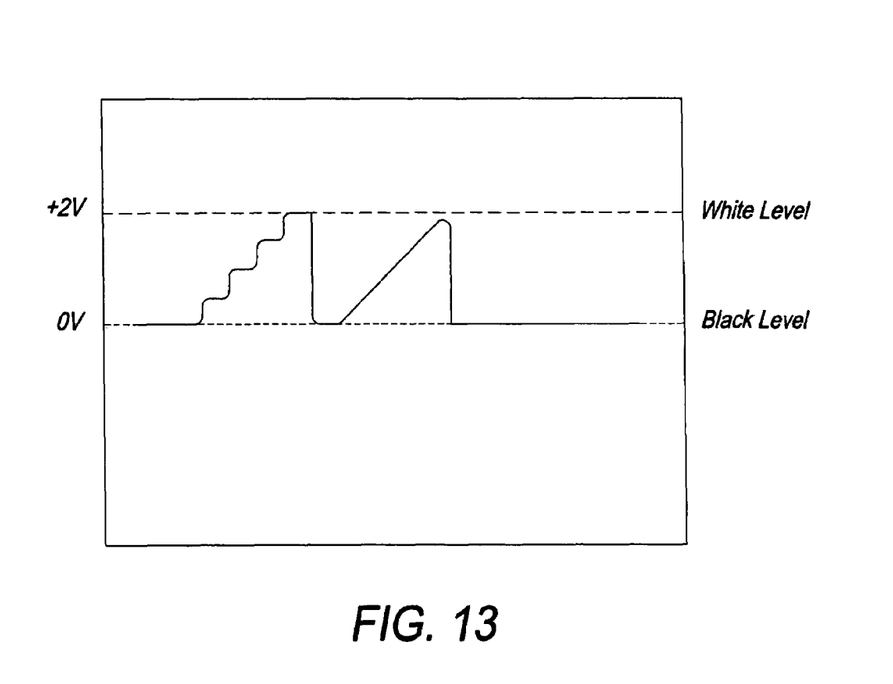

Transistor 204 is connected in the feedback path of operational amplifier 202. Transistor 204 functions together with resistor 208 to provide a voltage reference. The reference voltage appears across the emitter base junction of transistor ? and the voltage value is a result of the current drawn through transistor 204 by resistor 208. The result of the voltage reference developed across transistor 216 is to provide a positive voltage offset that is added to the composite video signal being amplified by operational amplifier 202 (FIG. 11). This offset occurs because the output of the operational amplifier 202 must drive positive far enough to overcome the base emitter voltage drop of transistor 204 before the transistor begins to conduct, which in turn completes a DC feedback path around operational amplifier 202.

Capacitor 206 stabilizes the feedback path by maintaining a forward bias condition for transistor 204 during active sync pulse periods where the operational amplifier's output swings negative. In order for the output of operational amplifier 202 to drive its inverting input to the same zero volt potential as its non-inverting input that is connected to circuit ground, the amplifier's output must swing positive with respect to 0 volts by the base emitter voltage drop of transistor 204.

The resulting offset voltage appearing at the output of operational amplifier 202, places the black level of the composite signal at approximately 700 mV positive with respect to 0 volts, common or ground. This offset is necessary since it places the black level of the signal at the cutoff voltage of the emitter follower transistor 216. By doing so, any signal content that drives the output of operational amplifier 202 negative with respect to its developed offset voltage or black level, will immediately enter the cutoff voltage region of transistor 216.

The cutoff voltage verses temperature tracking between transistor 204 and transistor 216 is greatly enhanced by using a matched transistor pair that shares one common die. Transistor 216 is configured to function as an emitter follower for signal content that is positive with respect to the 700 mV offset and as a reverse biased diode for signal content that is negative with respect to the 700 mV offset. An undesirable effect of the emitter follower stage is that large negative signal transitions with very fast rise times are coupled capacitively from the base to the emitter of transistor 216. The result of this condition is that negative impulses at the leading edge of the negative sync pulse can appear at the emitter of transistor 216. To reduce this undesirable effect, the signal appearing at the emitter of transistor 216 (FIG. 12) is further processed by a translinear voltage limiter comprised of transistor 212, transistor 214 resistor 213, resistor 215 and resistor 210. In this part of the circuit, resistor 210 establishes a current flow through transistor 214. The voltage drop between the base and emitter of transistor 214 serves as a reference for and is communicated to transistor 212 holding it at the threshold of conduction so long as its emitter is at 0 volts. As the voltage presented to the emitter of transistor 212 becomes negative with respect to common ground or zero volts, transistor 212 changes from a threshold of conduction state to a high-level conduction state. As transistor 212 enters its high-level conduction state, it shunts negative impulses appearing at its emitter to the positive power supply rail. This is the result of the logarithmic voltage and current relationship that is maintained by the positively biased PN junction of the transistor 212.

Figure 14:
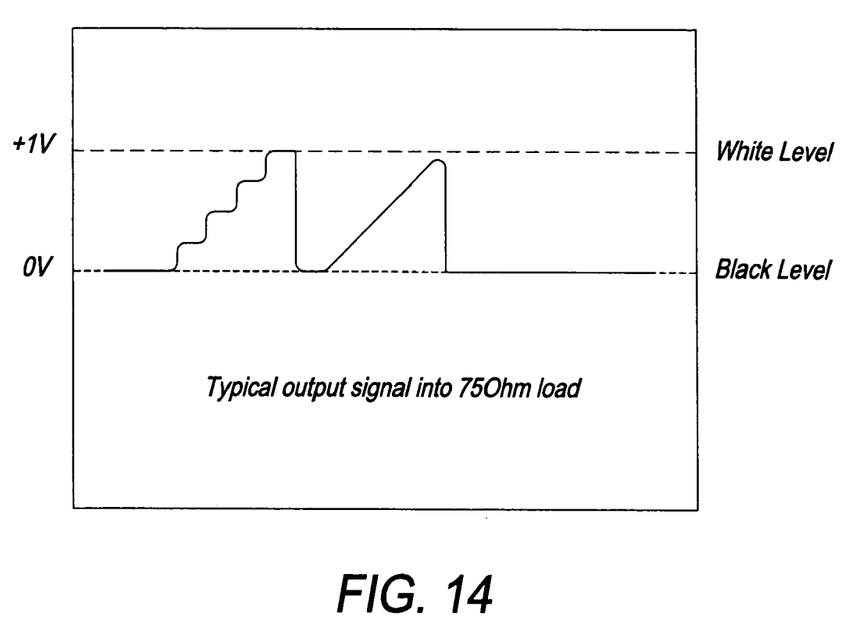

Resistor 213 connects the emitters of transistors 216 and 212. The signal appearing at the emitter of transistor 216 contains buffered visual information and capacitively coupled, short duration, negative pulse artifacts. This signal is connected to one side of resistor 213. The other side of resistor 213 is connected to the emitter of transistor 212, part of the translinear negative voltage clamp. In this configuration, resistor 213 dissipates the majority of the negative pulse artifact as heat and a signal virtually free of any negative pulse artifacts appears at the emitter of transistor 212 (FIG. 13) and is referred to as video minus sync. From this point, the signal is ready for output buffering to produce the output signal (FIG. 14).

The objective is to realize a high-performance technique for removing negative going synchronization pulses from high-resolution computer video signals filtered by the preceding stages. As alluded to above, the invention system uses large, synchronization pulse is for noise immunity and improved signal-geometry tolerance.

In application, if attenuation of the negative sync pulse is not at an acceptable level, for example, if the pulse artifacts are on the order of hundreds of millivolts, undershoot may close on display equipment to falsely store the value of the bottom of the pulse as the black level, causing color shifting and image stability problems. While, in principle, synchronization removal should remove all traces of the original pulse, it is sufficient if the remaining synchronization artifacts have a value of 50 millivolts or less. In practice, complete removal of synchronization artifacts is, from a practical standpoint, difficult, expensive and unnecessary.

In the inventive approach, the use of a high-speed operational amplifier and a series of four transistors provides very abrupt clamping with extremely low undershoot.

In accordance with the present invention, it is also contemplated that wider range may be achieved with a minimal number of fixed filters by having the fixed filters compensate for different lengths of transmission line. For example, the FIG. 3 embodiment may be modified to make filter 32 compensate for 1000 feet of transmission line. An additional filter stage may be added to compensate for 2000 feet of transmission line. Yet another additional filter stage may be added to compensate for 4000 feet of transmission line. By selectively introducing filter stages of different length compensating characteristics into the system, fixed filters with total compensation between zero and 7500 feet may be combined. Finer increments between zero and 500 feet may be added using variable filter 42, thus providing continuous coverage between zero and 8000 feet by incorporating the appropriate fixed filters and adjusting the adjustable filter to the desired value.

In this case, selection of resistors and capacitors to form the various poles in the filters should be made to provide overall acceptable performance in the various different combinations, as opposed to the case illustrated in FIGS. 1-9 where filters can be optimized for both transmission line length and a particular filter arrangement, as only one filter arrangement will be used whenever a particular filter is added to the system.

While an illustrative embodiment of the invention has been described, it is understood that various modifications will be obvious to those of ordinary skill in the art. Such modifications are within the spirit and scope of the invention which is limited and defined only by the appended claims.

The invention claimed is:

1. A transmission line filter system, comprising:
   (a) a first filter having an input and an output adapted to compensate for the characteristics of a first length of twisted-pair wire;
   (b) a first bypass path having an input and an output for bypassing said first filter;
   (c) a second filter having an input and an output adapted to compensate for the characteristics of a second length of twisted-pair wire;
   (d) a second bypass path having an input and an output for bypassing said first filter;
   (e) a third filter having an input and an output adapted to compensate for the characteristics of a third length of twisted-pair wire;
   (f) a third bypass path having an input and an output for bypassing said first filter;
   (g) a coupling device for coupling an input high resolution video signal;
   (h) a first input switch for connecting said coupling device to the input of said first filter or said first bypass path;
   (i) a first output switch coupling the output of said first filter, when said first input switch is connecting said coupling device to the input of said first filter, or coupling said first bypass path when said first input switch is connecting said coupling device to said first bypass path;
   (j) a second input switch for connecting said first output switch to the input of said second filter or said second bypass path;
   (k) a second output switch coupling the output of said second filter, when said second input switch is connecting said first output switch to the input of said second filter, or coupling said second bypass path when said second input switch is connecting said first output switch to said second bypass path;
   (l) a third input switch for connecting said second output switch to the input of said third filter or said third bypass path;
   (m) a third output switch coupling the output of said third filter, when said third input switch is connecting said second output switch to the input of said third filter, or coupling said third bypass path when said third input switch is connecting said second output switch to said third bypass path; and
   (n) an output coupling line coupled to receive the output from said third output switch.

2. A transmission line filter system as in claim 1, further comprising a twisted-pair feed coupled to said coupling device.

3. A transmission line filter system as in claim 1, wherein said second filter compensates for said second length and said first filter, and said first filter or said second filter is adjustable to compensate for the characteristics of a variable length of line.

4. A transmission line filter system as in claim 1, wherein said second and third lengths are equal to each other.

5. A transmission line filter system as in claim 1, wherein said third length is twice as long as said second length.

6. A transmission line system as in claim 1, further comprising a clamping system coupling said third output switch to said output coupling line, said clamping system comprising a high-speed operational amplifier first clamp coupled to the output of said third output switch, the output of said operational amplifier first clamp being coupled to one end of a forward-biased semiconductor junction, the other end of said semiconductor junction being coupled to a second semiconductor clamp, said second semiconductor clamp having a second junction and exhibiting capacitance across said second junction, a third semiconductor clamp receiving the output of said second semiconductor clamp, said third semiconductor clamp being biased to cause a geometric increase in current flow through said third semiconductor clamp to regulate an undershoot condition at the output of said second semiconductor clamp.

7. A transmission line filter system as in claim 1, further comprising a twisted-pair feed coupled to said coupling device, and wherein said second filter compensates for said second length and said first filter, and said first filter or said second filter is adjustable to compensate for the characteristics of a variable length of line.

8. A transmission line filter system as in claim 7, wherein said second and third lengths are equal to each other.

9. A transmission line filter system as a claim 8, wherein said filters are multiple filters, said filters comprising a plurality of resistor-capacitor networks.

* * * * *